(12) United States Patent
Taylor

(10) Patent No.: US 8,523,116 B2
(45) Date of Patent: Sep. 3, 2013

(54) PANEL-MOUNTED AIRCRAFT CONTROL STICK

(75) Inventor: Jeremy Phillip Taylor, Bel Aire, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 13/468,631

(22) Filed: May 10, 2012

(65) Prior Publication Data

US 2012/0217349 A1 Aug. 30, 2012

Related U.S. Application Data

(63) Continuation of application No. 12/163,388, filed on Jun. 27, 2008, now Pat. No. 8,186,632.

(51) Int. Cl.
*B64C 13/04* (2006.01)

(52) U.S. Cl.
USPC ........................................................ 244/221

(58) Field of Classification Search
USPC .................................. 244/220, 221, 234, 237
See application file for complete search history.

(56) References Cited

U.S. PATENT DOCUMENTS

| 1,803,498 | A |   | 5/1931  | Chilton |     |
|-----------|---|---|---------|---------|-----|
| 1,806,432 | A |   | 5/1931  | Upson   |     |
| 2,460,374 | A |   | 2/1949  | Walls   |     |
| 3,011,739 | A | * | 12/1961 | Boyce et al. | 244/237 |
| 3,016,215 | A |   | 1/1962  | Ross    |     |
| 4,012,014 | A |   | 3/1977  | Marshall |    |
| 4,778,133 | A | * | 10/1988 | Sakurai | 244/234 |
| 5,395,077 | A |   | 3/1995  | Wolford |     |
| 5,769,363 | A |   | 6/1998  | Griswold et al. | |
| 5,878,981 | A | * | 3/1999  | Dewey   | 244/190 |
| 6,857,597 | B2 | * | 2/2005  | duPont | 244/12.5 |

OTHER PUBLICATIONS

Select File History from related U.S. Appl. No. 12/163,388, dated Apr. 4, 2011 through Feb. 1, 2012, 47 pages.

* cited by examiner

*Primary Examiner* — Tien Dinh
*Assistant Examiner* — Keith L Dixon
(74) *Attorney, Agent, or Firm* — Lathrop & Gage LLP

(57) ABSTRACT

A panel-mounted control stick for aircraft providing for roll and pitch input that emulates the response of a traditional floor-mounted control stick. The panel-mounted control stick incorporates a pitch beam input assembly and a roll input assembly for translating the movements of the control stick into movements of aircraft control surfaces.

4 Claims, 10 Drawing Sheets

PANEL-MOUNTED AIRCRAFT CONTROL STICK

RELATED APPLICATION

This application is a continuation of U.S. patent application Ser. No. 12/163,388, filed Jun. 27, 2008 now U.S. Pat. No. 8,186,632, the disclosure of which is incorporated herein by reference.

BACKGROUND OF THE INVENTION

1. Field of the Invention

The invention relates generally to aircraft. More specifically, the invention relates to the field of control systems design.

2. Description of the Related Art

Traditional, floor-mounted control sticks for input of pitch and roll movements to an aircraft have long been known in the aviation arts. Such control sticks have significant drawbacks. These sticks make it difficult for pilots to get into and out of the cockpit because the stick blocks access to the floor of the cockpit, and the pilot must climb over it to get into the pilot's seat. Side-mounted sticks provide easier access than a traditional control stick, but may only be operated with one hand and lack the mechanical advantage of the center mounted stick. An alternative panel-mounted yoke also provides easier access, but may cause safety issues due to a limited range of motion due to obstruction of the yoke by the pilot's legs. The panel-mounted stick disclosed in this application addresses these, and other, issues in aircraft control systems.

SUMMARY

The invention is defined by the claims below. Embodiments of the invention include a panel-mounted control stick for controlling the pitch and roll of an aircraft. The system includes a pitch beam assembly and a control stick assembly. The pitch beam assembly includes a pitch beam and a pitch beam input assembly. The pitch beam assembly, in embodiments, includes a control stick bracket, a pitch beam bracket, and a swivel assembly. The roll input assembly, in embodiments, includes two bellcranks, two spool bearings, and a shaft retainer.

BRIEF DESCRIPTION OF THE DRAWINGS

Illustrative embodiments of the present invention are described in detail below with reference to the attached drawing figures, which are incorporated by reference herein.

DETAILED DESCRIPTION

Figure 1:
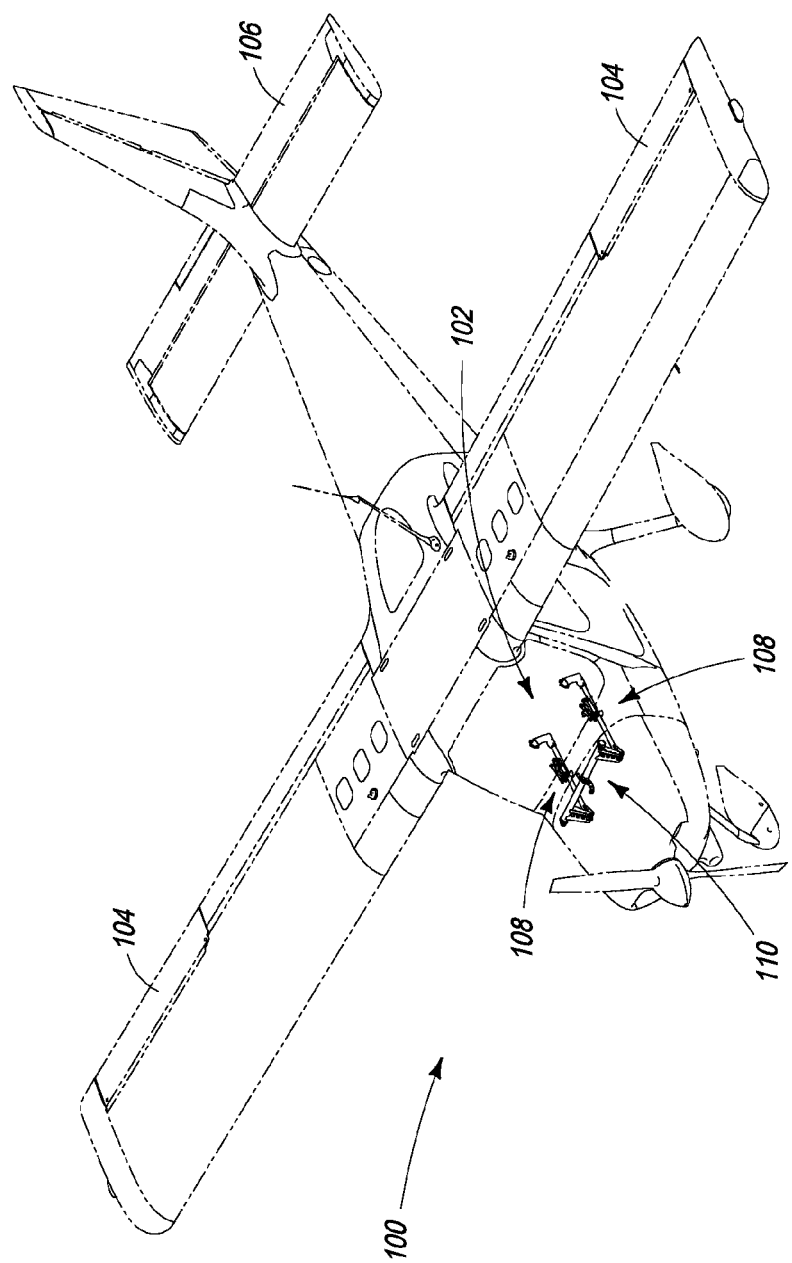
FIG. 1 is a perspective view of an aircraft incorporating an embodiment of the panel-mounted control stick.

Referring now to FIG. 1, an aircraft 100 contains a control stick module 102 located in the cockpit area of aircraft 100. Aircraft 100 shown in FIG. 1 is a small aircraft commonly known in aviation; however the panel-mounted control stick could be utilized in numerous other sorts of aircraft and other aircraft designs instead of that shown in FIG. 1. Aircraft 100 includes various control surfaces, including an aileron pair 104 for controlling the roll of aircraft 100 and an elevator pair 106 for controlling the pitch of aircraft 100. The specific control surfaces shown on aircraft 100 may also comprise elevons or various other designs for aircraft control surfaces. The specific design for aircraft 100 shown in FIG. 1 does not form any part of the invention but is merely for illustrative purposes.

Control stick module 102 comprises at least one control stick assembly 108 and pitch beam assembly 110, which will be described in further detail below. FIG. 1 displays an embodiment of the invention comprising two control stick assemblies 108. In other embodiments of the invention there may be only one control stick assembly or the control stick assemblies may be located in different relative configurations.

The control stick assemblies 108 are connected through various linkages to the control surfaces of aircraft 100 to allow for movement thereof in a manner known to those skilled in the art. Thus, pitch and roll are able to be controlled by the pilot of aircraft 100 in flight by manipulating stick assemblies 108. A pilot and optional co-pilot input pitch and roll control to the aircraft 100 by various movements of control stick assemblies 108.

The user inputs necessary for operation of control stick module 102 by a pilot are similar to those of traditional aircraft control sticks known in the aviation arts. Pushing forward on the control stick assembly 108 causes the control surfaces to move and pitch the nose of aircraft 100 down, while pulling back on control stick assembly 108 causes the nose of aircraft 100 to pitch up. Similarly, pushing right on control stick assembly 108 moves the control surfaces causing aircraft 100 to roll right, and pushing left on the control stick assembly 108 causes aircraft 100 to roll left.

Figure 2:
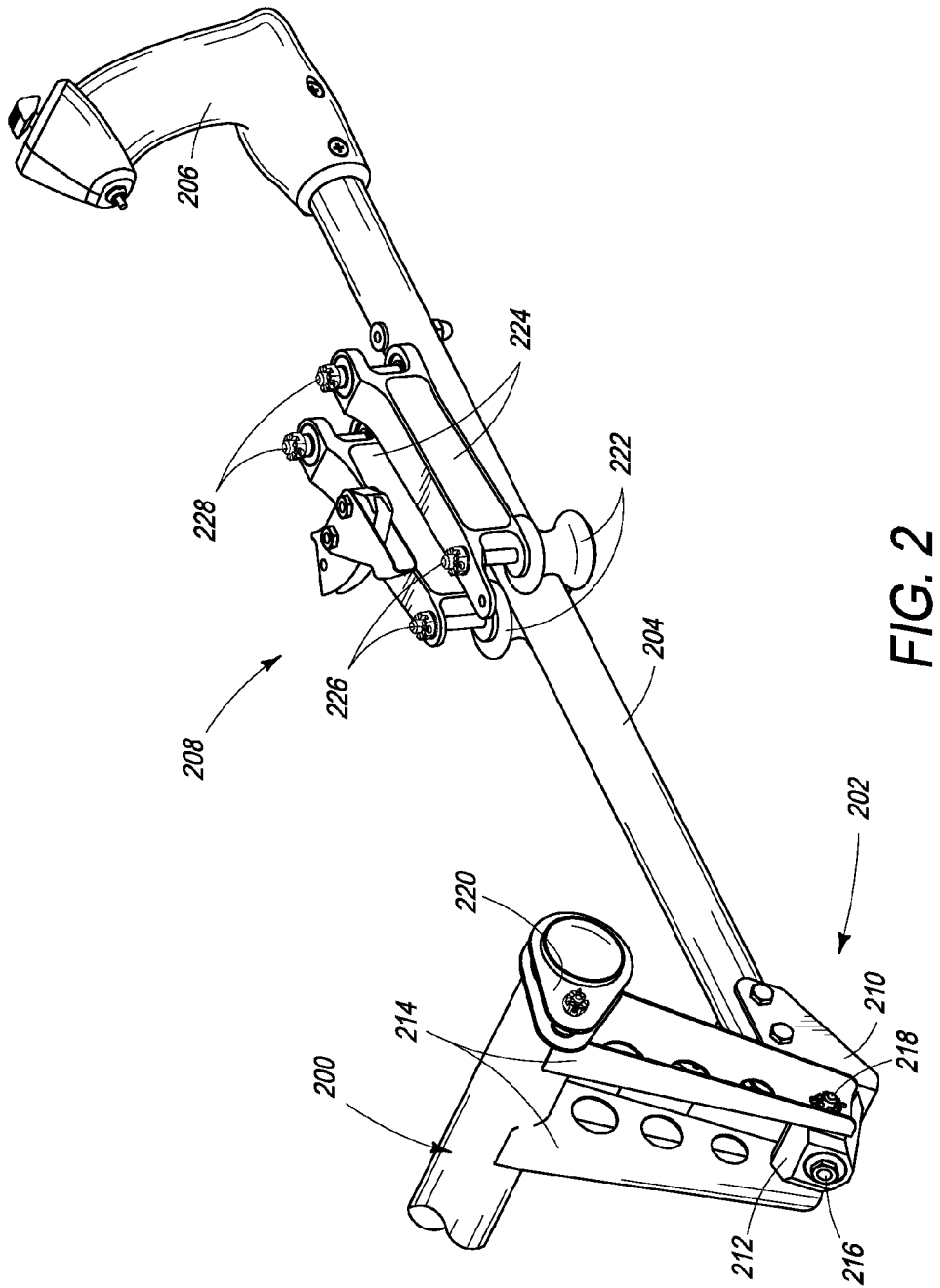
FIG. 2 is a perspective view of the panel-mounted control stick.

Referring now to FIG. 2, a detailed perspective view of the control stick assembly 108 and the pitch beam assembly 110 is shown. Pitch beam assembly 110 comprises a pitch beam 200 and one or more pitch beam input assemblies 202. Each pitch beam input assembly 202 translates movement of one control stick assembly 108 into movement of pitch beam 200 and thus to the appropriate control surfaces, such as elevator 106 through various linkages of types commonly known in the aviation arts.

The control stick assembly 108 comprises control stick shaft/input translating member 204, control stick grip/input receiving member 206 and roll input assembly/first attitudinal control member 208. Control stick grip 206 is utilized by the pilot of aircraft 100 for manual input of roll and pitch control movements, and may be formed of metal, plastic or a combination thereof. Control stick grip 206 incorporates a socket for receiving a first end of control stick shaft 204, and is also secured to shaft 204 by bolts, screws or other similar means of attachment. Grip 206, in the FIG. 2 embodiment, is substantially perpendicular to control stick shaft 204, though it may be inclined slightly forward for comfort of the pilot. Control stick shaft 204 is formed from circular metal tube, though solid bar or shafts with other cross-sectional shapes may be utilized. A second end of control shaft 204 is connected to pitch beam 200 by pitch beam input assembly 202.

Pitch beam input assembly 202 comprises a control stick bracket/first rotational translation member 210, a swivel assembly/multi-directional connecting member 212, and pitch beam brackets/second rotational translation member 214. Brackets 210 and 214 may be formed from bent metal plate, or forged, cast or otherwise shaped as shown. Swivel assembly 212, in the disclosed embodiment, is machined or cast from solid metal. The control stick bracket 210 is attached to the second end of control stick shaft 204 by bolts or other appropriate means of attachment including welding. Alternatively, control stick bracket 210 may be formed as an integral part of control stick shaft 204 through machining, welding, casting or other similar means.

Swivel assembly 212 is rotatably attached to control stick bracket 210 by control stick swivel bolt 216. The rotatable connection allows control stick bracket 210 to rotate around the longitudinal axis of bolt 216 thus allowing the side to side movement of control shaft 204 necessary for the roll input.

Swivel assembly 212 is also rotatably attached to a first end of pitch beam brackets 214 by pitch beam swivel bolt 218. The longitudinal axis of pitch beam swivel bolt 218 is substantially parallel to the functional axis of the pitch beam, as described below. The second ends of pitch beam brackets 214 are each attached by means of welding, bolts or other fixed attachment, to pitch beam 200, such that translation of the first end of pitch beam brackets 214 causes pitch beam 200 to rotate about its functional axis.

During operation of the control stick module 102, fore and aft movement of control stick grip 206 is transmitted along control stick shaft 204 to control stick bracket 210 and swivel assembly 212, which translates the first ends of pitch beam brackets 214. The translation of pitch beam bracket 214 causes pitch beam 200 to rotate around its functional axis. The rotation of pitch beam 200 is transmitted to control surfaces, such as elevator 106, by means of control linkages as known in the aviation arts, such as cables, rods, or wires.

The functional axis of pitch beam 200 may be varied according to the means of mounting pitch beam 200, and may be coincident with the longitudinal axis of pitch beam 200 or may be offset by means of an offset mounting. The embodiment shown in FIG. 2 has an offset functional axis due to pitch beam mounting bracket 220. Bracket 220, in the disclosed embodiments, is formed from metal plate cut to the required shape and attached to pitch beam 200 by welding. Pitch beam mounting bracket 220 is rotatably attached to the frame of aircraft 100 providing support for pitch beam assembly 110 as well as allowing pitch beam 200 to rotate around its functional axis. Additional brackets 220 may be provided as necessary to properly support pitch beam 200.

The roll input assembly 208 provides support to control stick shaft 204 and accepts input of roll commands from the pilot of aircraft 100. Roll input assembly 208 comprises two spool bearings 222, two bellcranks 224, two spool bearing mounting bolts 226 and two bellcrank mounting bolts 228. Bellcranks 224, in the disclosed embodiments, are formed from cast or machined metal.

Spool bearings 222 are formed from metal, or some other suitable material, and have a top, a bottom and a concave face. The spool bearings 222 have substantially circular cross-sections parallel to the top and bottom faces thereof, which is more clearly shown in FIG. 9 described below. The cross-sections of spool bearings 222 perpendicular to the top and bottom faces thereof vary based on the geometry of the concave face. The concave face may have a substantially semi-circular geometry, as shown in the embodiment shown in FIG. 10. The concave face may alternatively comprise two interior planar surfaces disposed at an angle to each other, one extending from the top surface of the spool bearing 222 and the other extending from the bottom surface of spool bearing 222, and intersecting at a point substantially midway between the top and bottom surfaces of spool bearing 222 and between the outer edge of the top and bottom surfaces and the bolts 226. Each spool bearing 222 depends from and is rotatably attached to a bellcrank 224 by spool bearing mounting bolt 226, which extends through spool bearing 222 perpendicular to the top and bottom faces of the bearing 222. Each bellcrank 224 is rotatably attached to the frame of aircraft 100 by a bellcrank mounting bolt 228.

Control linkages, as commonly known in the aviation arts, connect the bellcranks 224 to control surfaces, such as ailerons 104, on aircraft 100. As shaft 204 is translated left or right by movement of grip 206, the shaft 204 exerts a force on the left or right spool bearing 222. The force is transmitted from spool bearing 222 to bellcrank 224, causing the bellcranks 224 to rotate around bolt 228. As bellcranks 224 rotate left or right around bolt 228 the control linkages transfer the movement to the control surfaces thus causing aircraft 100 to roll left or right.

Spool bearings 222 are positioned on opposing sides of shaft 204 and the concave faces of spool bearings 222 support shaft 204 and allow it to translate fore and aft as spool bearings 222 rotate around bolts 226.

Figure 3:
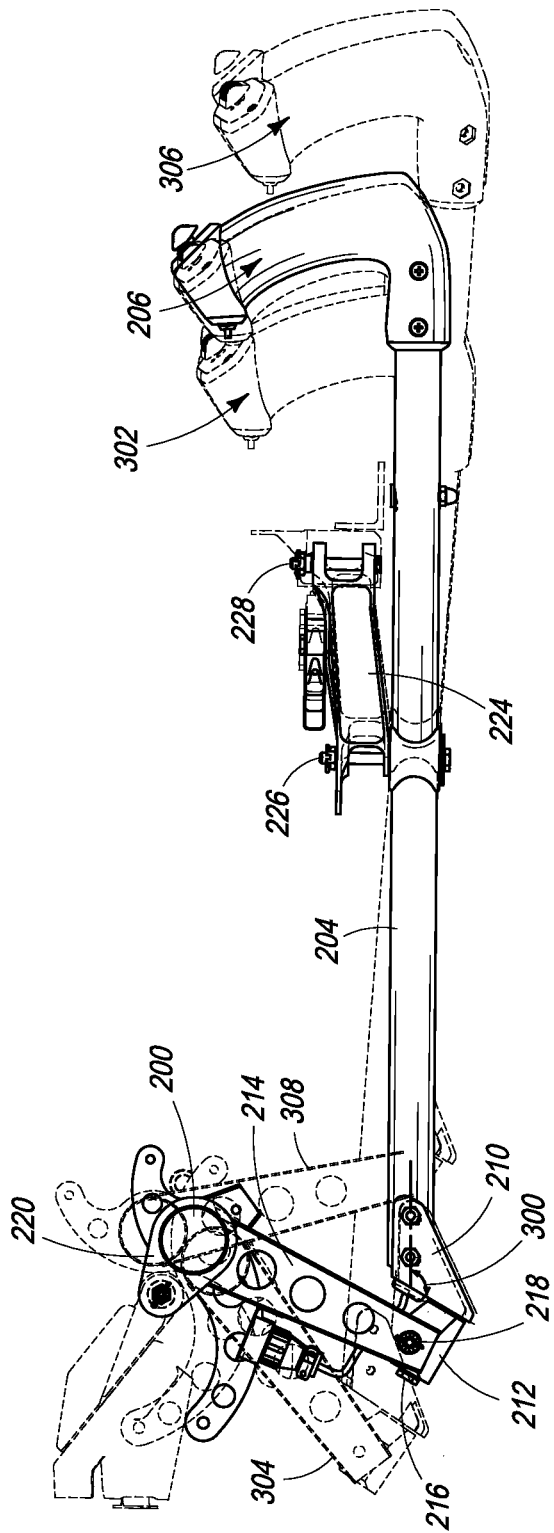
FIG. 3 is a side view of the panel-mounted control stick.

Referring now to FIG. 3, a side view of the control stick module 102 is shown. In this view it can be seen that the control bracket 210 secures shaft 204 at an angle 300 to the longitudinal axis of bolt 218.

Control stick grip 206 is pushed fore and aft by the pilot of aircraft 100 to pitch the nose of the aircraft down and up, respectively. When grip 206 is pushed forward to position 302 control stick shaft 204 translates forward thus rotating pitch beam bracket 214 to fore position 304. When grip 206 is pulled back to aft position 306 then shaft 204 translates aft thus rotating pitch beam bracket 214 to aft position 308.

Figure 4:
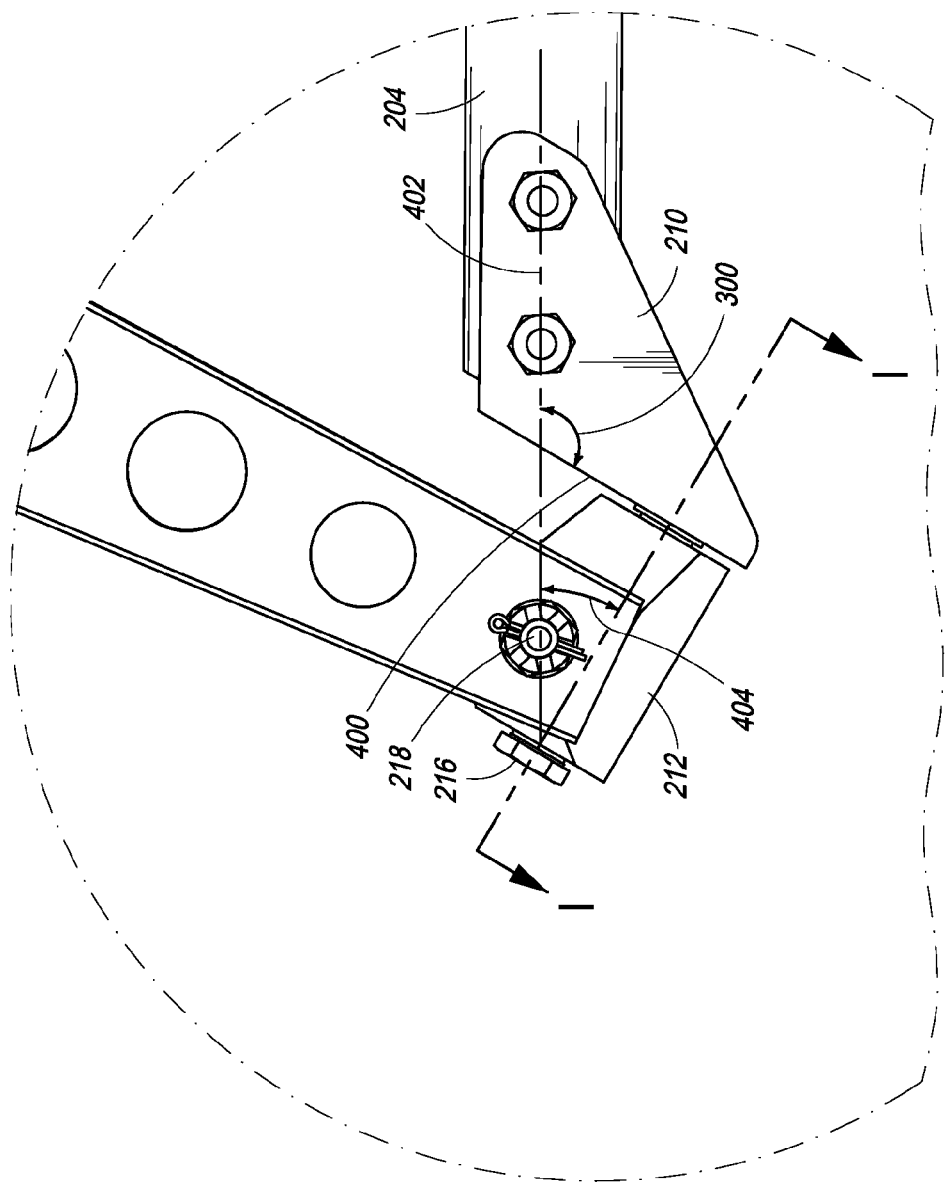
FIG. 4 is a detailed side view of the pitch beam input assembly.

FIG. 4 provides a detailed side view of the pitch beam input assembly 202. As can be seen more clearly here, angle 300 subtends an arc between a first surface 400 of control stick bracket 210, and a central axis 402 of shaft 204. Bolt 216, around which bracket 210 swivels, is substantially perpendicular to the first surface 400. The angle 404, between axis 402 and the axis of bolt 216, is equal to angle 300 minus 90 degrees. The angle 300 may be varied in different embodiments of the panel-mounted stick, and as is discussed in detail below, altering this angle varies the operation of the panel-mounted stick system.

Figure 5:
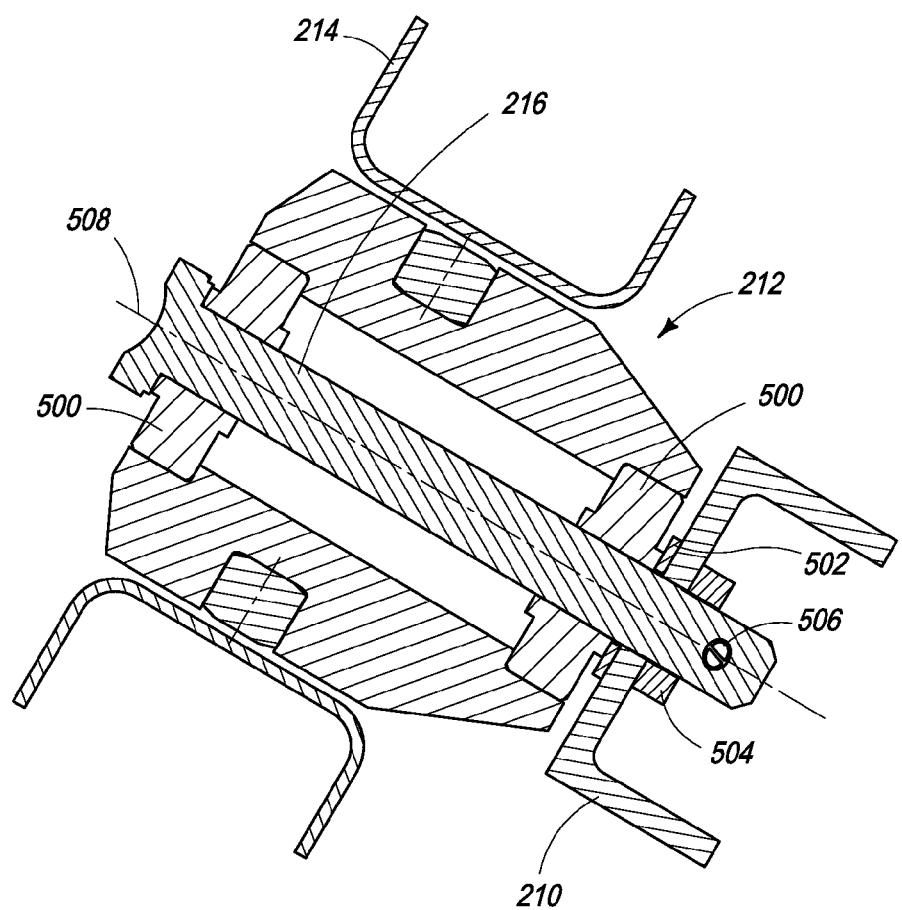
FIG. 5 is a cross-sectional view of the pitch beam input assembly.

FIG. 5 is a cross-sectional view of swivel assembly 212, pitch beam bracket 214 and control stick bracket 210 along the line I-I on FIG. 4. Bolt 216 rotatably attaches swivel assembly 212 to bracket 210. Bolt 216 is supported within swivel assembly 212 by bearings 500, which are formed from metal or some other suitable material. Metal washer 502, castellated nut 504 and cotter pin 506 secure bracket 210 to swivel assembly 212. Bolt 218, not shown on FIG. 4, similarly attaches bracket 214 to swivel assembly 212 along axis 508.

Figure 6:
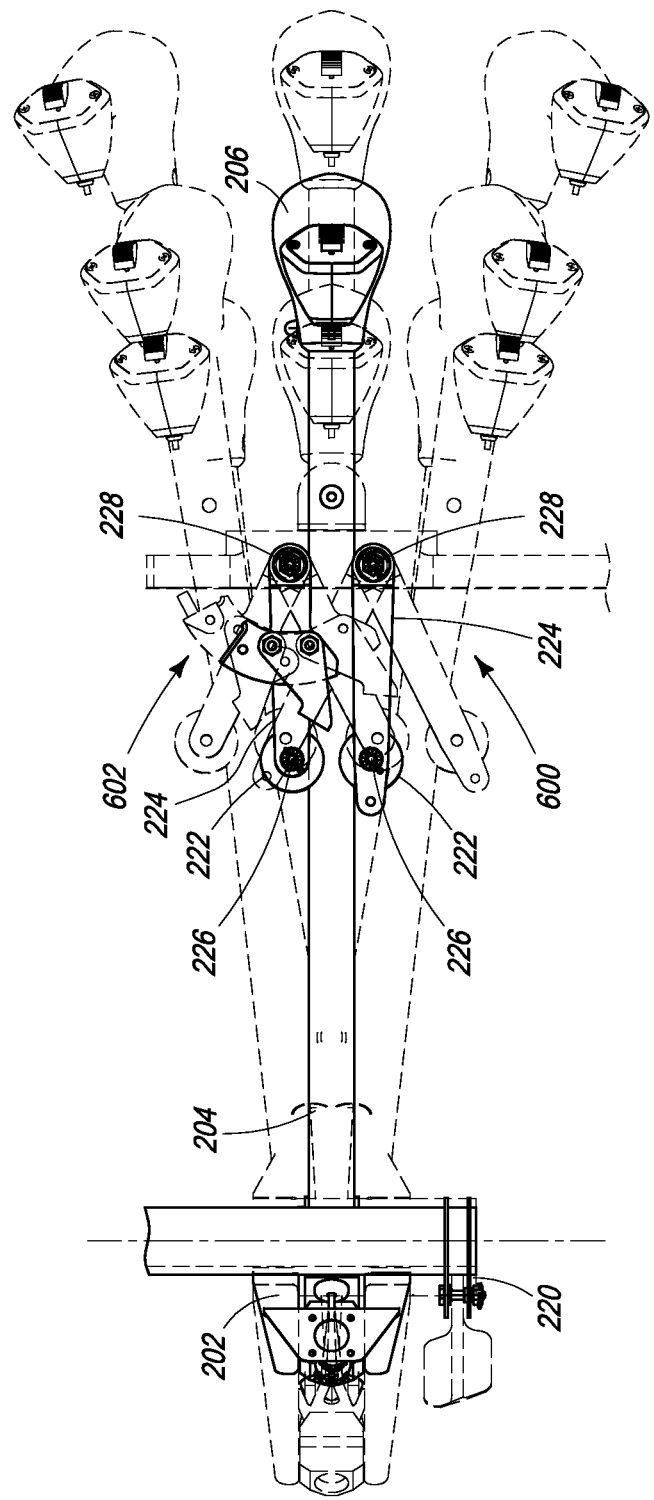
FIG. 6 is a top view of the panel-mounted control stick.

FIG. 6 is a top view of the control stick module 102 showing the range of motion of the control stick assembly 108 and the pitch beam assembly 110. As the pilot of aircraft 100 moves the grip 206 to the left and right, control shaft 204 presses against spool bearings 222 causing bellcranks 224 to move left to position 600 and right to position 602, respectively. Control linkages, commonly known in the aviation arts, connect bellcranks 224 to control surfaces of aircraft 100 (e.g., ailerons 104 shown in FIG. 1) for causing the aircraft to roll. At any point of movement left and right between position 600 and position 602, the grip 206 may also be moved fore and aft to actuate the pitch beam input assembly 202.

Figure 7:
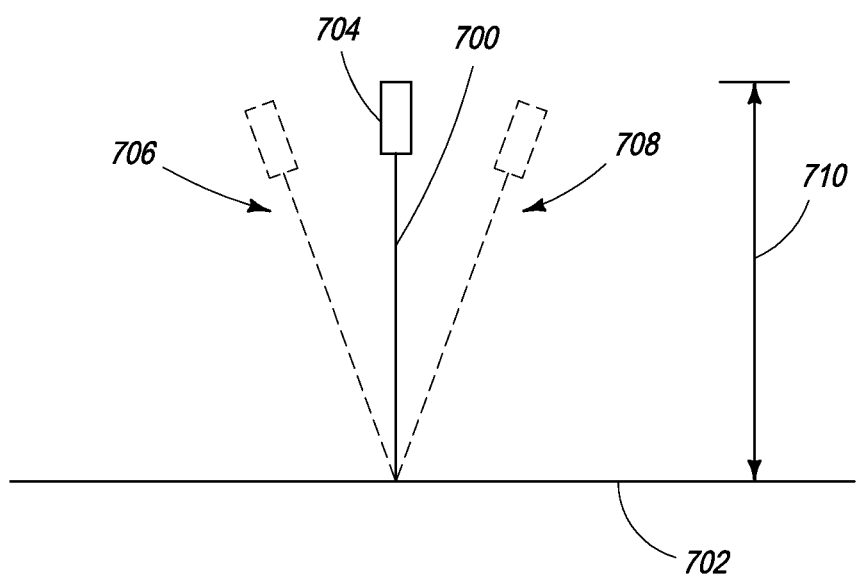
FIG. 7 is a conceptual view of a traditional aircraft control stick.

FIG. 7 is a representation of a traditional control stick as seen from the pilot's location in aircraft 100. A traditional control stick 700 extends vertically from the cockpit floor 702, thus as it is moved left or right the end of the control stick 700 follows an arc around the pivot point of the control stick 700. This causes the longitudinal axis of the grip 704 to tilt from side to side as the stick is translated left or right to positions 706 and 708. The angle of tilt is determined by the extent of movement side to side and by the length 710 of the control stick 700.

Figure 8:
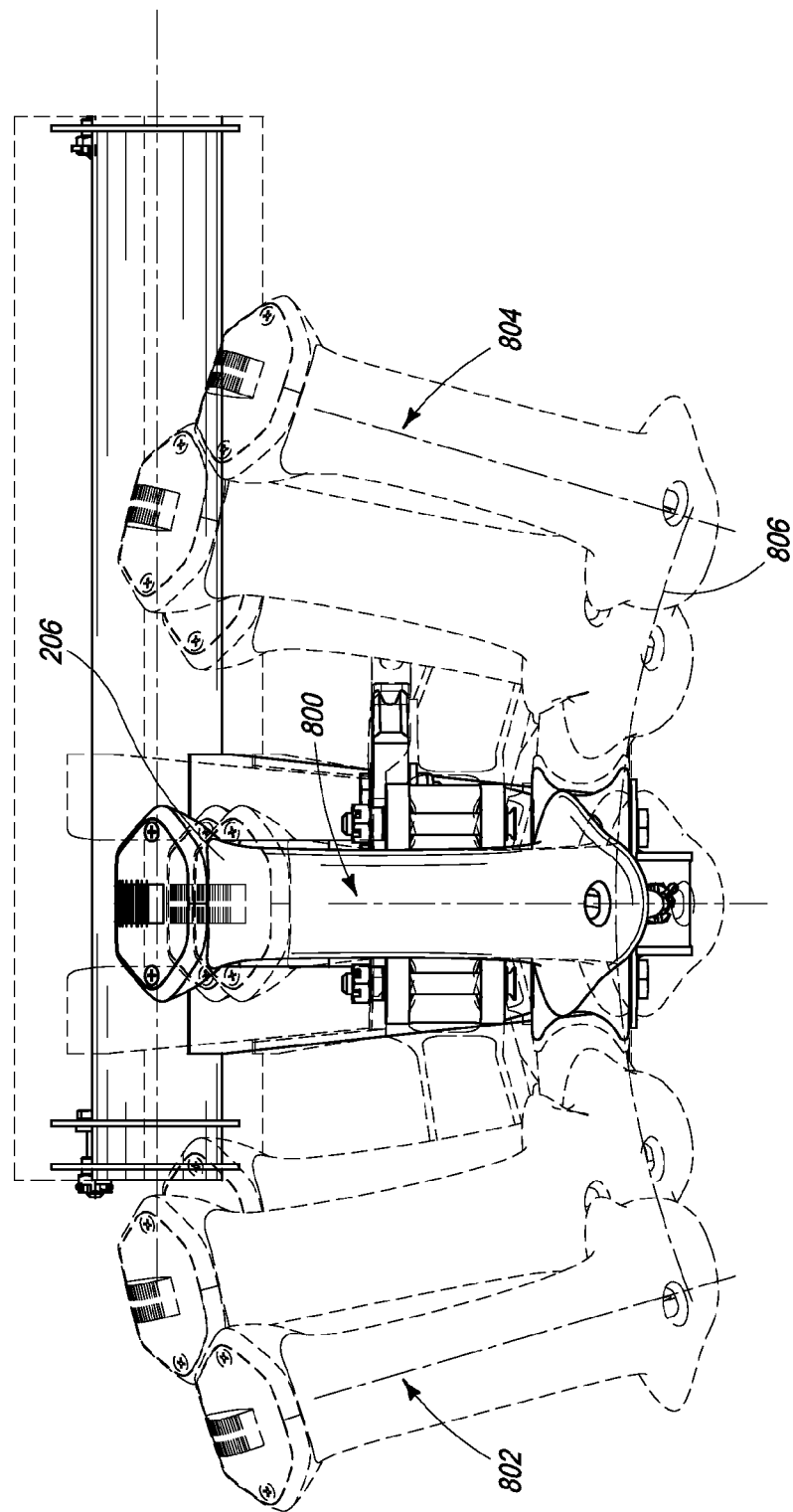
FIG. 8 is an end view of the panel-mounted control stick.

FIG. 8 is a view of the control stick module 102 from the pilot's location within the cockpit of aircraft 100. The control stick module 102 emulates the traditional aircraft control stick shown in FIG. 7 in several respects, one of which is the tilt of the control grip 206 as it is translated to the left or right by the pilot of aircraft 100. In the neutral position the longitudinal axis 800 of grip 206 extends perpendicular to the floor of the cockpit of aircraft 100. When moved to the left to position 802 or to the right to position 804 the longitudinal axis 800 of grip 206 tilts to the left or right respectively. The grip 206 tilts in the same manner as though it were on a traditional control stick extending to the floor of the cockpit.

The tilting of grip axis 800 is caused by the rotating of shaft 204 and bracket 210 around bolt 216. The angle 300, shown in FIG. 3, causes the first end of shaft 204 to describe an arc 806 when shaft 204 rotates around bolt 216. The grip 206 is attached in a fixed orientation to the first end of shaft 204 and thus remains substantially perpendicular from this perspective, to the tangent of the arc 806 described by shaft 204 which causes the grip to tilt as it is moved from side to side. This movement of grip 206 is equivalent to the movement of grip 206 if attached to the top of a virtual control stick extending to the cockpit floor of aircraft 100. The apparent length of the virtual control stick, x, is:

x=y tan(angle 404) or equivalently x=y tan(angle 300−90 degrees);

where y is the length of control stick shaft 204.

Figure 9:
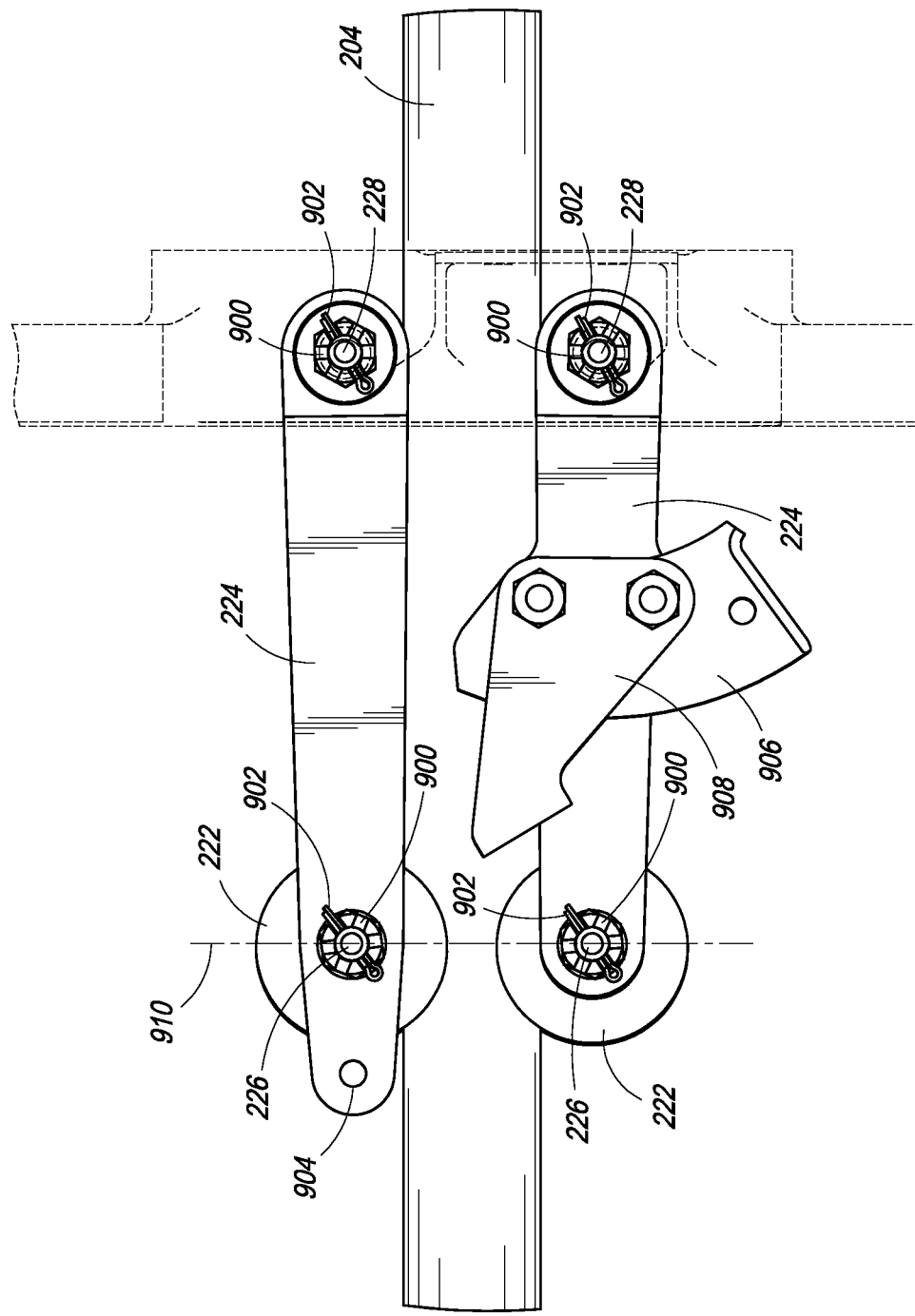
FIG. 9 is detailed top view of the roll input assembly.

FIG. 9 is a detailed top view of the roll input assembly 208. Bellcrank mounting bolts 228 and spool bearing mounting bolts 226 are secured by castellated nuts 900 and cotter pins 902. Bellcranks 224 have various attachment points for linkages to control surfaces on aircraft 100, such as mounting point 904, mounting bracket 906 and cable guard 908.

Figure 10:
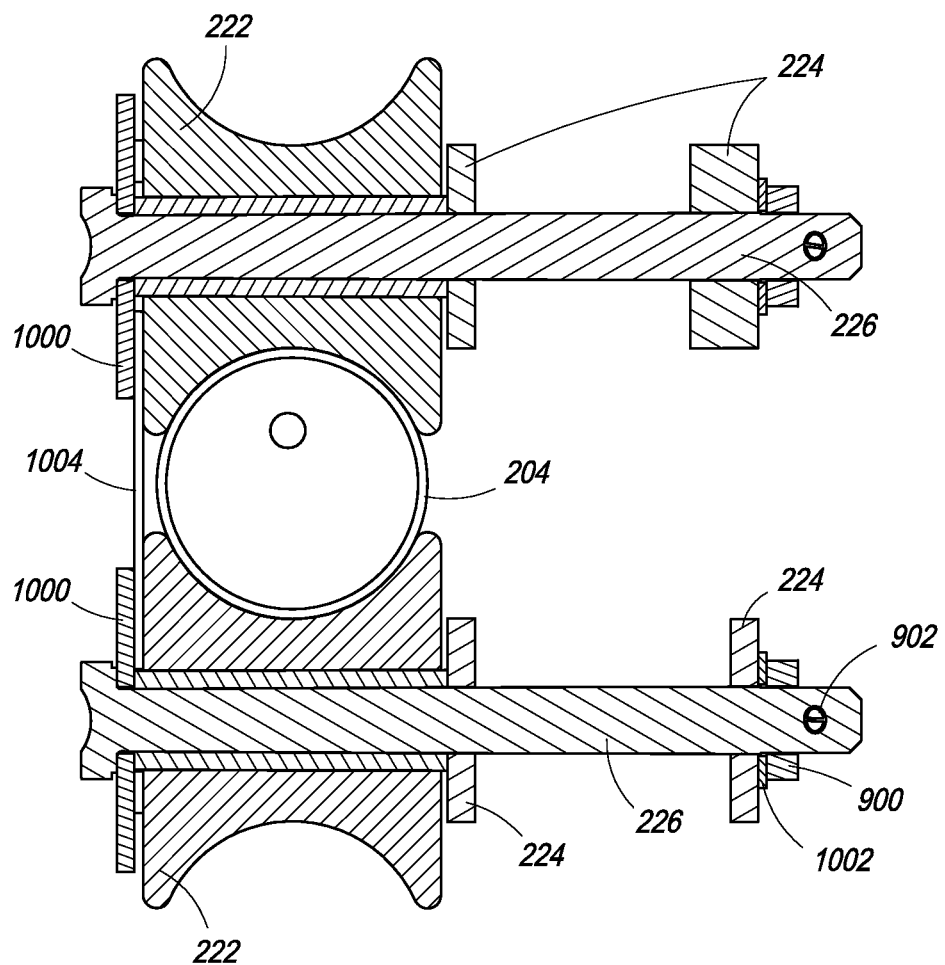
FIG. 10 is a cross-sectional view of the roll input assembly.

FIG. 10 is a cross-sectional view of spool bearings 222 and bellcranks 224 along axis 910 shown in FIG. 9. Spool bearings 222 and bellcranks 224 are secured on bolts 226 by washers 1000 and 1002, and castellated nut 900 and cotter pin 902. In addition, the two bolts 226 may be optionally connected by shaft retainer 1004. Retainer 1004 allows bolts 228 to rotate freely in relationship to retainer 1004, but maintains the fixed separation distance between bolts 228 thus securely holds shaft 204 between spool bearings 222. The retainer 1004 and the fixed location of the bellcrank mountings by bolts 228 allow bellcranks 224 to individually rotate about bolts 228 in response to roll input received through shaft 204 while remaining substantially parallel to each other and applying appropriate inputs to control linkages as previously described.

A second retainer 1004 may optionally be provided to connect the two bolts 226 at a second point to increase the stability of the control stick 204. The second retainer 1004 may be secured to the bolts 226 between the top of bellcranks 224 and washers 1002. The second retainer 1004, or a third retainer 1004 could also be provided between the bottom of bellcranks 224 and the top surface of spool bearings 222.

The invention claimed is:

1. A panel-mounted control module for controlling an aircraft comprising:
an input translating member having a longitudinal axis, and a first end and a second end disposed at opposing ends of the longitudinal axis;
a first rotational translation member attached to a first end of the input translating member;
a handgrip attached to a second end of the input translating member;
a multi-directional connecting member rotateably attached to the first rotational translation member with a first rotational axis;
a second rotational translation member rotateably attached to the multi-directional connecting member with a second rotational axis;
wherein the first rotational axis is substantially perpendicular to the second rotational axis; and
the first rotational axis is disposed at an acute angle to the longitudinal axis of the input translating member; and
the longitudinal axis of the input translating member intersects the second rotational axis in or substantiall adjacent to the multi-directional connectin member; and
the longitudinal axis of the input translating member intersects the first rotational axis in or substantially adjacent to the multi-directional connecting member.

2. The control module of claim 1 wherein lateral translation of the second end of the input translating member describes an arc.

3. The control module of claim 2 wherein the arc is a portion of the circumference of a circle with its center on the first rotational axis.

4. The control module of claim 3 wherein the center of the circle is substantially located near the floor of the aircraft beneath the second end of the input translating member.

* * * * *